United States Patent [19]
Chapman

[11] Patent Number: 5,743,937
[45] Date of Patent: Apr. 28, 1998

[54] EARTH MELTER WITH RUBBLE WALLS AND METHOD OF USE

[75] Inventor: Chris C. Chapman, Richland, Wash.

[73] Assignee: Battelle Memorial Institute, Richland, Wash.

[21] Appl. No.: 723,942

[22] Filed: Sep. 26, 1996

[51] Int. Cl.$^6$ .................... C22B 9/20; C22B 9/21
[52] U.S. Cl. ............... 75/414; 75/10.1; 266/142; 405/129; 588/237
[58] Field of Search ............... 75/414, 10.1; 266/142; 405/129; 588/237

[56] References Cited

U.S. PATENT DOCUMENTS 3,800,014   3/1974   Brichard ..................... 266/283
5,443,618   8/1995   Chapman ..................... 75/414

*Primary Examiner*—Melvyn Andrews
*Attorney, Agent, or Firm*—Paul W. Zimmerman

[57] ABSTRACT

The present invention is an improvement to the earth melter described and claimed in U.S. Pat. No. 5,443,618. The improvement is the use of rubble for retaining walls. More specifically, the retaining walls rest on ground level and extend above ground level piling rubble around a melt zone. A portion of the melter may be below grade wherein sidewalls are formed by the relatively undisturbed native soil or rock, and the rubble may be used as a backfill liner for the below grade sidewalls.

16 Claims, 3 Drawing Sheets

EARTH MELTER WITH RUBBLE WALLS AND METHOD OF USE

FIELD OF THE INVENTION

This invention is a method and apparatus for melting feed material for disposal. More specifically, the invention makes use of rubble for retaining walls for containing melted feed material. Rubble is specifically defined as brick or other man-made refractory material, or combinations thereof wherein the particles of the rubble, refractory pieces have a random orientation with respect to other elements. In other words, rubble excludes stacked brickwork. Rubble further specifically excludes earthen or concrete berms.

BACKGROUND OF THE INVENTION

U.S. Pat. No. 5,443,618 describes an earth melter wherein sidewalls are formed of native soil (FIG. 1). The earth melter 10 is provided in an excavated area 14 of previously undisturbed soil 12. Undisturbed soil is native soil or rock, for example basalt. The grade level 58 represents the upper portion of the melter body. The excavated area 14 is a depression having sidewalls 16 with an angle of repose 18 of from about 20 degrees to about 60 degrees from the horizontal, preferably about 45 degrees. The excavated area 14 is topped with an upper portion 19, having a containment 20, generally in the form of a metal wall, separated from the sidewalls 16 by at least two feet of containment materials. The excavated area 14 is enclosed above ground by cover 30 on the upper portion 19.

The sidewalls 16 may be lined with a backfill material 32. The backfill material 32 is locally-obtained native materials such as rock or soils that are refractory and corrosion resistant. Alternatively, this backfill material 32 is waste brick and refractory from the metals and glass industries.

Feed material enters the melter through a feed material inlet 34 through the cover 30. The feed material is melted in the melter such that a melt pool of feed material 36 having a molten surface 52, and a relatively more dense melt pool of heavier metals 38 is formed. After the feed material is initially melted, subsequent introduction of feed material causes an excess of feed material 40 to occur "floating" on the glass pool 36. An air inlet 42 is positioned to introduce air into the excess feed material 40 to enhance the oxidation of all or a portion of the feed material.

Some feed materials can either contain free metals or be reduced during the melting process and accumulate beneath the molten pool as indicated 38. One strategy is to oxidize these accumulated metals to an oxide to become more soluble in the molten glass 36. This can be effected by injecting air or gases enriched in oxygen through a conduit 44. The conduit can be inserted directly in the molten pool 38 or in the molten pool 36.

The molten pools 36, 38 are maintained with electric electrodes 48, 50. If the feed material is combustible, the feed material is oxidized and the hot gasses produced thereby can be used to pyrolyze, preheat and dry additional incoming feed material and be retained within the air space 46.

The molten pool of glass 36 may be continuously withdrawn from an upper outlet 54 or intermittently withdrawn through a lower outlet or tap 56. The upper outlet 54 has a weir 80 and weir outlet 86 discharging into a cooling area 76, wherein the liquid glass material is cooled and solidified 88. The liquid glass stream exiting through outlet 86 may be quickly cooled (as by immersion in a quench tank 90). The glass is then susceptible to removal, as by conveyor 92, for further processing.

The tap 56 is provided with an inlet end 72 and a discharge end 74. The discharge end 74 is in the process area 76.

The disadvantage of this earth melter, is that it requires that the sidewalls be relatively undisturbed which may be less desirable in specific applications.

SUMMARY OF THE INVENTION

The present invention is an improvement to the earth melter described and claimed in U.S. Pat. No. 5,443,618, hereby incorporated by reference. The improvement is the use of rubble for retaining walls. More specifically, the retaining walls rest on ground level and extend above ground level piling rubble around a melt zone. A portion of the melter may be below grade wherein sidewalls are formed by the relatively undisturbed native soil or rock, and the rubble may be used as a backfill liner for the below grade sidewalls.

It is an object of the present invention to provide a method and apparatus for converting feed materials to a consolidated, relatively harmless melted condition, suitable to alternative productive uses or for long-term storage without environmental insult.

It is a further object of the invention to provide an apparatus that is easy and inexpensive to build, whether as an above grade melt zone or combination above grade and below grade melt zone.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION OF THE PREFERRED EMBODIMENTS

Figure 1:
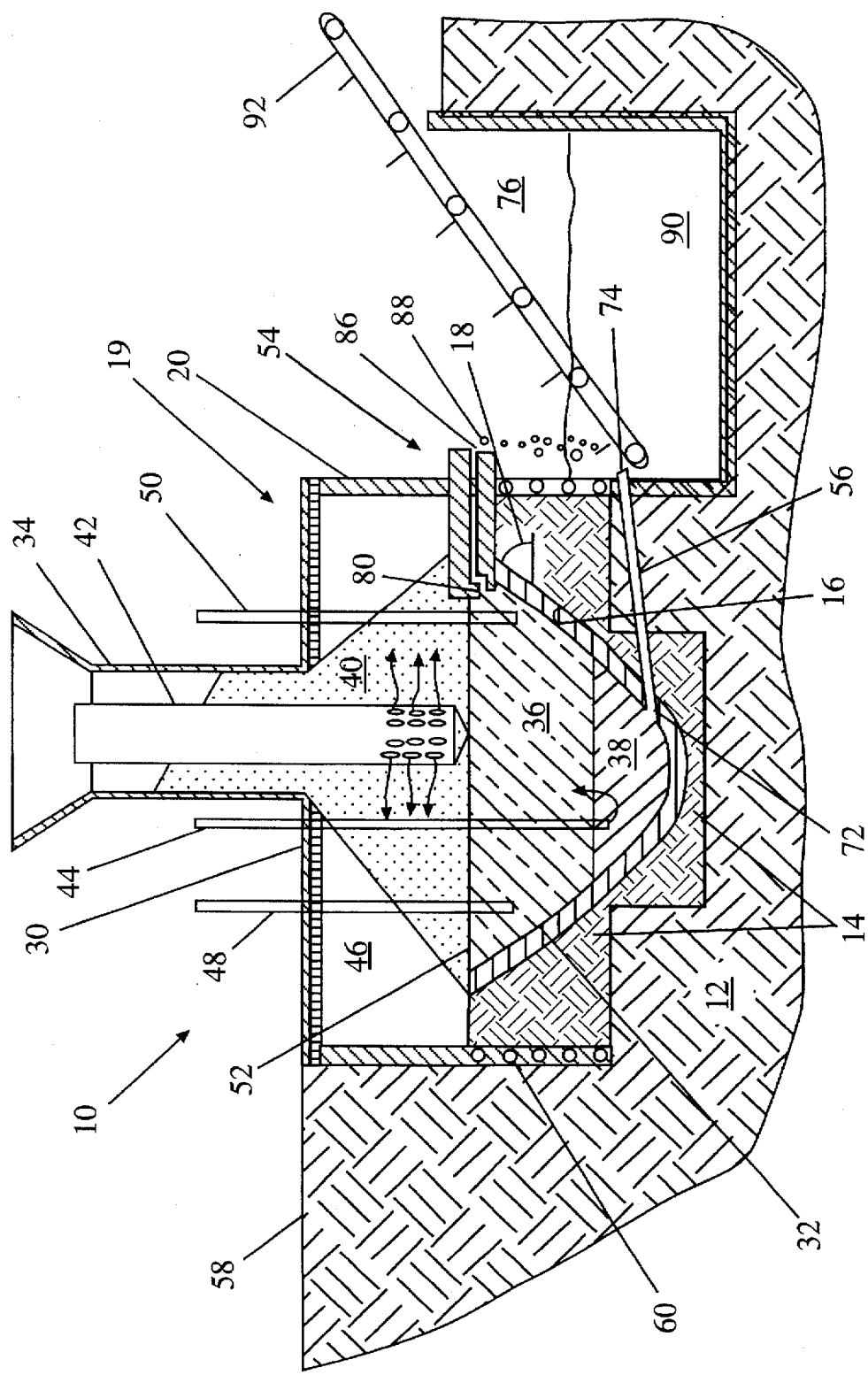
FIG. 1 is a cross section of a prior art earth melter.

The invention is an improvement to the earth melter shown in FIG. 1 and described above. Specifically, the apparatus of the present invention is for melting feed materials for subsequent use or safe disposal in a relatively harmless condition, and has:

(a) retaining walls defining a melt zone for melting the feed materials, said retaining walls resting on a ground level and extending above the ground level, said retaining walls constructed of rubble;

(b) a cover extending over the retaining walls and defining an air-filled space between a quantity of melted feed materials and the cover;

(c) a feed material inlet extending through the cover to permit feed materials to be introduced onto the melt zone;

(d) a heating element for heating the feed material such that a molten pool of feed materials is produced in the melt zone; and (e) at least one outlet to withdraw a portion of the molten pool of feed materials from the melt zone.

Figure 2:
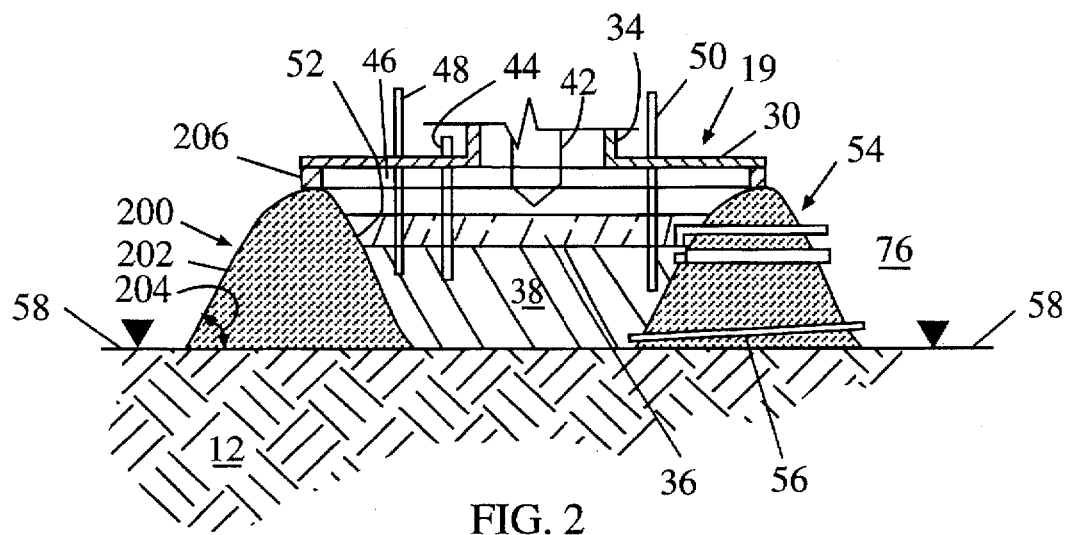
FIG. 2 is a cross section of an above grade melter with rubble walls.
Figure 3:
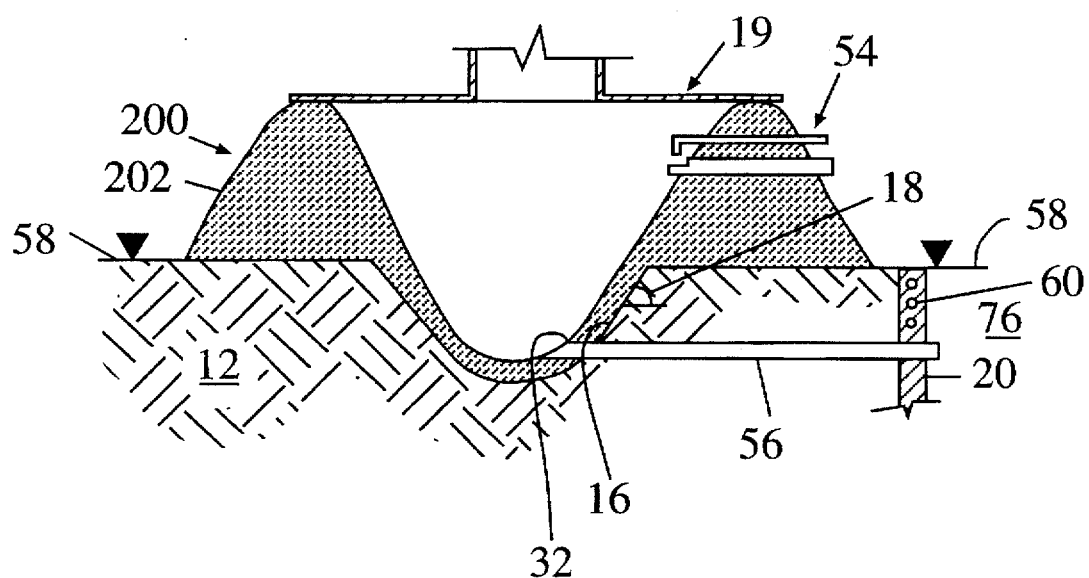
FIG. 3 is a cross section of a melter with rubble walls extending below grade.

The configuration of the apparatus of the present invention is shown schematically in FIGS. 2 and 3. Retaining walls 200 are made of rubble resting on the ground level 58 and piled to extend above the ground level 58. The sides 202 have an angle of repose 204 ranging from about 20 degrees to about 60 degrees. The retaining walls 200 may be of any cross sectional shape or any geometric closed form to define a melt zone. The rubble may be substantially uniform in size, but is preferably of mixed sizes so that the retaining walls 200 are well sealed. Rubble size is preferably less than 1 foot for a maximum dimension, and more preferably less than about 3 inches for a maximum dimension. QUESTION: HOW LARGE ARE LARGE OLIVINE ROCKS?

Figure 4:
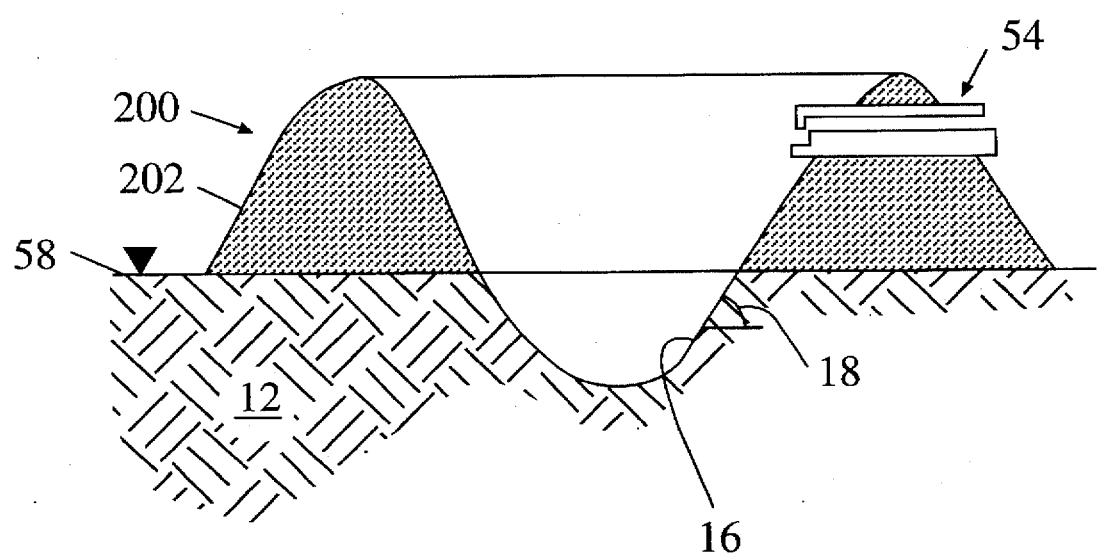
FIG. 4 is a cross section of a melter extending below grade and above grade with rubble walls above grade.

The melter may be constructed entirely on and above ground level as shown in FIG. 2 or may include a portion below ground level as shown in FIG. 3. The below ground portion has sidewalls 16 that may be lined with backfill 32 as shown in FIG. 3, or not lined as shown in FIG. 4. The native soil 12 is excavated into a cup-shaped depression having side walls 16 with an angle 18 of about 45 degrees. While this angle can be from about 20 degrees to about 60 degrees, Applicant has found that low cost results are obtained with an angle 18 of about 45 degrees. The selection of the side wall angle 18 is dependant on the angle of repose for the back fill or native materials, melter depth and the minimum surface area required to process the feed material. The native soil 12 is then overlain with a quantity of selected backfill 32 to a thickness of about one to three feet. The thickness of the retaining walls 200 and/or backfill material 32 depends on the material selected and its expected service. When the material is more corrosion resistant, less material is required. The rubble and/or backfill material 32 is waste brick and refractory, for example from the metals and glass industries. Alternatively, the rubble may be large refractory rocks, for example olivine rocks. The rubble and/or backfill material 32 would typically not melt at temperatures up to 1500 degrees C. and preferably be enriched in alumina, silica, zirconia, or magnesium with varying concentrations.

Those skilled in this art will recognize that the feed material may take many different forms. For example, rather than being an accumulation of waste products produced by man (such as medical wastes), the feed material may consist of, e.g. soils contaminated by hazardous chemicals. In such case, the "glass pool" may not fall within the generally accepted definition of "glass". In the case of soil, the "glass" may be a lava-like mass. Therefore, as used herein, the term "glass" is used generically to define the melted feed material, in whatever form it takes.

The dimensions of the melt zone will depend upon the desired capacity of the apparatus. For example, a melter with a capacity to process 50 tons of a particular feed material per day would have an outside diameter of about 32 feet, while a capacity of 100 tons/day would require a diameter of about 40 feet. This outside diameter depends on several variables including the typical melting rate of the feed material, the viscosity of the melting material, its corrosiveness to the rubble, the electrode placement, and the depth the electrode penetrates into the molten material. The general character of the melter's dimensions are as follows. The area inside the circle which contains the electrodes must be sufficient to melt the feed material at the desired rate. Typical noncombustible feed materials require from 3 to 6 square feet of surface area per ton per day to be melted. Next, a separation between the high convection of the melted material around the electrode and the inside containment material is selected. The retaining wall is set out sufficiently to maintain a nearly quiescent zone of molten material adjacent the side of the retaining wall. This assures low corrosion and nearly unlimited containment life. For molten MSW ash glass, we found this distance to be about four to six feet. For a different molten material and different electrode arrangement, this distance may differ.

The upper portion 19 may be supported by walls 206 as shown in FIG. 2, or directly on the retaining walls 200 as shown in FIG. 3.

While it is believed that optimum operation of the present invention will occur in an essentially continuous mode, it is possible to operate the melter in a batch-wise manner, both in the feed material input, and in the withdrawal of the molten pools. The rubble is selected depending upon the feed material to be processed. The rubble and/or backfill is adapted to contain the molten pool of glass and the molten pool of oxides and metals.

A containment wall 20 may surround the side walls 16. The containment wall 20 may be placed beyond the periphery of the retaining walls 200 as shown in FIG. 3, or may be placed nearer the sidewalls 16 before placing the retaining walls 200 over the containment wall 20. The containment wall may also include conduits 60 for cooling. The wall 206 shown in FIG. 1, may extend through the retaining wall 200 toward the ground level 58 and may include cooling conduits. Alternatively, the wall 206 may be placed on the outer periphery of the retaining wall 200, either vertically in which case the outer periphery of the retaining wall 200 could be vertical as supported by the wall 206, or resting on the side 202 of the retaining wall 200 at the angle of repose 204.

A heating element is provided for melting and maintaining waste material in a molten state. The heating element has at least a first inlet 34 for introduction of fuel and a second inlet 44 for introduction of a gas for oxidation of the fuel. For maintaining the melt, the heating element is a plurality of electrodes 48, 50 immersed in the molten pool of feed materials which dissipate electric energy within said feed material.

Applicant has found that the melting of feed materials proceeds most effectively and with the least cost if the glassification (melting) occurs due to heat generated by the oxidation of the feed materials, while induction of current through the glass pool provided by at least two spaced-apart electrodes 48 and 50 maintains the molten pool in a homogeneous, non-stratified condition. The electrodes 48, 50 lowered through the cover 30 and extend a sufficient distance into the glass pool 36 to insure that sufficient current passes through the pool 36 to maintain the temperature above the melting point of the feed material.

Transmission of electric current through and heating thereby of molten material 36 is important for molten material that contain compounds that readily absorbs thermal radiation such as oxides of iron and chromium. For these common compounds transmission of heat by radiation is low at high temperatures and can lead to unmelted material relatively short distances from the molten surface 52. Insertion of the electrodes 48, 50 should be sufficient for adequate conduction but not excessive. The bottom end of the electrode should be above the molten metal pool 38 sufficiently to avoid shorting of the electric path and substantial loss of heating of the molten pool 36. Further, when inserted too far into the molten pool, excessive convection can be induced from the electrodes which can then induce more rapid corrosion/erosion on the containment walls 18 and shorten the melter's life. Although dependant of the depth of the molten material 36, we have found that the distance from the bottom of the electrode to the top of the molten metal 38 should be (I) more than 2 feet to avoid significant shorting and (ii) about half the depth of the molten material 36 to minimize excessive convection corrosion. For example, the electrodes may extend about three feet below the surface of glass pool 36. As with the feed material inlet 34 and the air inlet 44, the electrodes are secured within the cover member 30 in an air tight manner with a seal (not shown) between the electrodes and the cover member 30.

In the event that excessive or unacceptable corrosion of the side walls occurs, the integrity can be restored by adding additional rubble and/or backfill material. Native soil sidewalls may likewise receive added rubble and/or backfill to the side walls for the first time. Such additional backfill can be added by shutting down the apparatus, or if appropriate means have been provided (such as access doors through the cover), the backfill can be added while the apparatus is in operation. Of course, in the latter case, the backfill must be refractory grade in order to withstand being applied through the molten pools of materials.

Chemicals may be added to the feed material stream to enhance glassification, such as fluxes using alkali salts and glass formers such as silica, alumina or phosphates to assure the molten glass achieves the required leach resistance or some other desired end product characteristic.

Reducing agents to reduce and precipitate or volatilize metals such as iron, nickel, copper, arsenic, selenium, silver, antimony, lead can be provided. Reducing agents can effect the formation and coalescence of higher density valued metals which collect on the bottom of the melter 38. Alternatively, these metals can be volatilized and concentrated in the off-gas system where recovery and reuse can be effected. The accumulation of these metals may be reduced or eliminated by injection air, or another gas enriched with oxygen, into the molten metal pool 38.

An excess of feed material builds up within the feed material inlet 34 and above the molten glass pool 36. Excess molten glass is removed with upper outlet 54 and after quenching by conveyor or screw (not shown).

Air is introduced into the melter through air inlets 42 which may be present in different numbers depending upon the capacity, feed material and other factors in order to assist oxidation of the feed material, effect preheating of the feed material and to distribute air through the bed of excess feed material. For the process that seeks a predominant oxide melt 36, the moisture needs to be removed, organic materials need to be decomposed/oxidized and residual char or carbon needs to be oxidized. Placement of the air inlet 42 within the excess feed material effects these results with a minimum amount of gas pressure while accomplishing drying, oxidization and preheating of the feed material. Melting of feed materials typically low in combustibles can be made more economic by the purposeful addition of fossil fuels such as coal or combustible solid wastes with the feed material.

Preheating the air entering through air inlet means 42 will improve the efficiency of melter. The inlet air may be heated by heat exchange means (not shown) located in the off-gas stream of the melter. This method will increase the efficiency of the melter process. Alternatively, a gas fired torch fired into the air stream with sufficient heat duty to preheat the air may be located immediately above the melter.

The apparatus may be constructed to be portable by making the melter small. A portable melter may not require a manufactured bottom, since it is constructed over soil. However, when a mobile melter is constructed a bottom is required to maintain the heat. Also, in some cases wherein extremely corrosive materials are being melted, excessive downward melting can occur through the retaining wall and/or backfill material (either the rocks or soil). In such case, cooling the bottom may sufficiently limit the downward penetration of the melt pool. Cooling pipes or other means can be utilized to reduce this temperature.

The rubble and/or backfill materials may be selected such that they sinter, densify and form an improved corrosion resistant lining when exposed to the extreme heat of an operational melter. Either the backfill materials, retaining walls, and/or the side walls may be provided with coolants to increase the operating life of the apparatus. The coolant may be gas or liquid, and preferably percolates upwardly through the side walls or backfill to cool the containment material. The cooler containment material results in increasing the viscosity of the melt pool adjacent the containment material (either the backfill or the side walls), thereby increasing the useful life of the backfill and side walls. The coolant may either be exhausted to the atmosphere, injected into the melter for disposal or recycled for further use.

In operation, this above-ground embodiment is first assembled at a preselected site. In addition, a trailer mounted power supply and off-gas treatment system (not shown) are connected to the melter. Finally, material to be processed is passed into the melter. Material handling can be done by anger, conveyor or other solid material handler.

The present invention has been shown and described in a manner sufficient to enable one skilled in this art to reproduce the invention. However, as will be readily obvious to such skilled artisan, numerous alternative modes of construction or operation of this invention are possible after access to the accompanying disclosure. The scope of this invention should not therefore be deemed limited by the scope of the specification set forth above, but rather only by the scope of the claims appended hereto.

I claim:

1. An apparatus for melting feed materials for subsequent use or safe disposal in a relatively harmless condition, comprising:
   (a) retaining walls defining a melt zone for melting the feed materials, said retaining walls resting on a ground level and extending above the ground level, said retaining walls constructed of rubble;
   (b) a cover extending over the retaining walls and defining an air-filled space between a quantity of melted feed materials and the cover;
   (c) a feed material inlet extending through the cover to permit feed materials to be introduced onto the melt zone;
   (d) a heating element for heating the feed material such that a molten pool of feed materials is produced in the melt zone; and
   (e) at least one outlet to withdraw a portion of the molten pool of feed materials from the melt zone.

2. The apparatus as recited in claim 1, wherein a backfill material lines a below-ground-level portion of the melt zone within the side walls.

3. The apparatus as recited in claim 2, wherein the backfill material is the rubble.

4. The apparatus as recited in claim 1, wherein the rubble is selected depending upon the feed material to be processed.

5. The apparatus as recited in claim 2, wherein the backfill material is adapted to contain the molten pool of glass and the molten pool of oxides and metals.

6. The apparatus as recited in claim 1, wherein a containment wall surrounds the side walls.

7. The apparatus as recited in claim 6, wherein the containment wall includes cooling means within the containment wall having a quantity of coolant dispersed therethrough.

8. The apparatus as recited in claim 1, wherein the heating element has at least a first inlet for introduction of fuel and a second inlet for introduction of a gas for oxidation of the fuel.

9. The apparatus as recited in claim 1, wherein the heating element is a plurality of electrodes immersed in the molten pool of feed materials which dissipate electric energy within said feed material.

10. The apparatus as recited in claim 9, wherein the electrodes convectively maintain the melted feed materials in the molten pool in a homogeneous condition.

11. A method of disposing of feed materials, in a melter, comprising the steps of:

(a) constructing retaining walls defining a melt zone for melting the feed materials, said retaining walls resting on a ground level and extending above the ground level, said retaining walls constructed of rubble;

(b) placing a cover over the retaining walls and defining an air-filled space between a quantity of melted feed materials and the cover;

(c) extending a feed material inlet through the cover and feeding materials onto the melt zone;

(d) heating the feed material such that a molten pool of feed materials is produced in the melt zone; and (e) withdrawing a portion of the molten pool of feed materials from the melt zone.

12. The method of claim 11, further comprising side walls positioned below ground level.

13. The method of claim 12, further comprising placing a backfill material on said side walls, said backfill material comprising said rubble.

14. The method of claim 11, further comprising wall for supporting said cover.

15. The method of claim 14, further comprising cooling the containment wall with cooling channels.

16. The method of claim 11, further comprising renewing a corroded portion of the retaining walls by backfilling backfill material into the melt zone.

* * * * *